(12) United States Patent
Duvander

(10) Patent No.: US 6,428,648 B1
(45) Date of Patent: *Aug. 6, 2002

(54) METHOD OF PRODUCING A WELL-INTEGRATED MULTILAYER MATERIAL

(75) Inventor: Patrik Duvander, Lund (SE)

(73) Assignee: Tetra Laval Holdings & Finance, Sa Pully (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,054
(22) PCT Filed: Nov. 26, 1996
(86) PCT No.: PCT/SE96/01546
§ 371 (c)(1),
(2), (4) Date: May 18, 1998
(87) PCT Pub. No.: WO97/19812
PCT Pub. Date: Jun. 5, 1997

(30) Foreign Application Priority Data

Nov. 29, 1995 (DK) .............................................. 1348/95

(51) Int. Cl.⁷ .............................................. B32B 31/00
(52) U.S. Cl. .................... 156/243; 156/244.27; 156/3.3; 525/196
(58) Field of Search ............................ 156/243, 244.27, 156/313; 525/196

(56) References Cited

U.S. PATENT DOCUMENTS

| | | | | |
|---|---|---|---|---|
| 3,630,826 A | * | 12/1971 | Rose et al. | 426/127 |
| 3,721,597 A | * | 3/1973 | Colburn | 156/313 |
| 3,840,427 A | * | 10/1974 | Bratier et al. | 426/127 |
| 3,882,259 A | | 5/1975 | Nohara et al. | |
| 4,178,401 A | | 12/1979 | Weinberg et al. | |
| 4,183,882 A | | 1/1980 | Weinberg et al. | |
| 4,346,196 A | * | 8/1982 | Hoh et al. | 525/196 |
| 4,376,845 A | * | 3/1983 | Metzger | 525/196 |
| 4,819,374 A | | 4/1989 | Gemgnani | |
| 5,112,424 A | * | 5/1992 | Cook | 156/243 |
| 5,278,229 A | | 1/1994 | Asano et al. | |

FOREIGN PATENT DOCUMENTS

EP   0686497   12/1995

* cited by examiner

Primary Examiner—John J. Gallagher
(74) Attorney, Agent, or Firm—Welsh & Katz, Ltd.

(57) ABSTRACT

A method for producing a well-integrated multilayer material having a first material layer adjacent a second material layer, the second material layer being sparingly compatible with the first material layer includes binding the first material layer to the second material layer with an adhesive layer consisting essentially of 60 to 95 parts of a high viscosity binder component and 5 to 40 parts of a low viscosity binder component. The low viscosity binder component is capable of binding to the first material layer and the second material layer and the high viscosity binder component is capable of interacting with the low viscosity binder component.

21 Claims, 1 Drawing Sheet

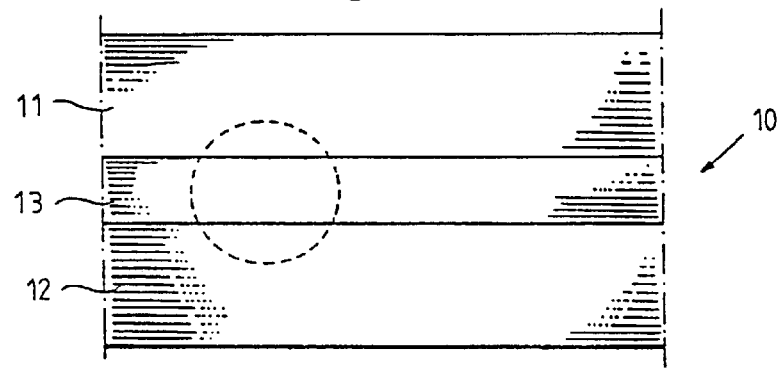
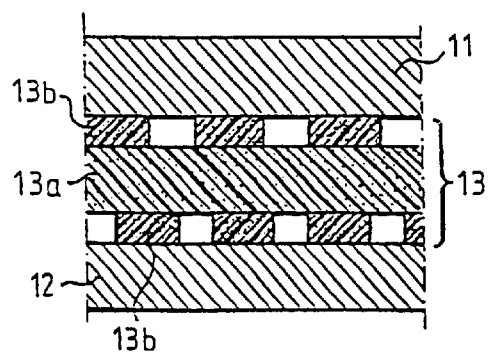
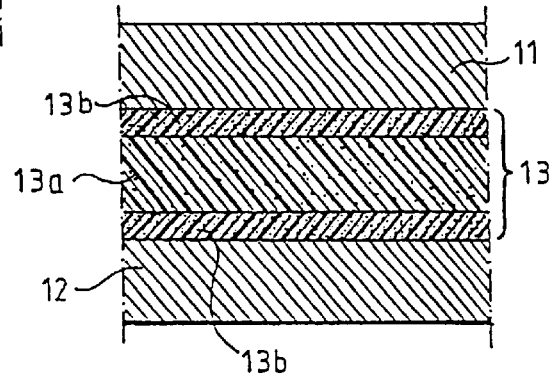

METHOD OF PRODUCING A WELL-INTEGRATED MULTILAYER MATERIAL

TECHNICAL FIELD

The present invention relates to a method of producing a well-integrated multilayer material comprising at least two adjacent layers of mutually sparingly compatible materials, in which method the two sparingly compatible material layers are permanently united to one another by means of an adhesive or binder which is applied between the layers.

BACKGROUND ART

Within packaging technology, use is often made of packages of the single-use type for transporting liquid foods, and a very large group of these so-called single-use disposable packages is produced from a packaging material comprising a plurality of individual material layers which are bonded to one another with good bonding strength for the formation of a well-integrated multilayer material (a packaging laminate).

The point of departure of the composition of the packaging laminate is to impart to the package the best possible protection for the product that is to be packed, at the same time as the package itself must be mechanically strong and stable, so as to make for rational handling and consumer-friendly use. The predominant group of such configurationally stable, easy-to-use disposable packages is produced from a packaging laminate comprising a configurationally rigid core layer of paper or paperboard and outer, liquidtight coatings of plastic, preferably polyethylene.

However, a packaging laminate consisting solely of paper or paperboard and polyethylene possesses no tightness properties vis-à-vis gases, in particular oxygen gas, and must therefore be supplemented with at least one additional layer (a so-called gas barrier) so as to make possible the production of gas-tight packages.

One well-known example of such a gas barrier is a thin (approximately 5–10 $\mu$m) foil of aluminium (so-called Alifoil) which is applied between the paper or paperboard layer of the packaging laminate and the one outer polyethylene coating. Other prior art examples of gas barriers are certain polymer materials, such as polycarbonate, polyamide, polyester and copolymers of ethylene and vinyl alcohol (EVOH) which, like the Alifoil, are applied between the paper or paperboard layer and the one polyethylene coating. Thin (approximately 200–500 Å) vacuum-deposited layers of metal (aluminium) and other inorganic materials (silicon oxide) have also been proposed in the art as gas barriers in packaging laminates of the above-described type. Among these examples, the Alifoil still retains its paramount position as a gas barrier in packages for oxygen gas sensitive products such as, for example, juice, wine, cooking oil etc., even though the alternative gas barrier materials—in particular EVOH—are being used to an increasing extent.

Packaging laminates or corresponding multilayer materials are generally produced by lamination and/or (co-) extrusion in one or more process stages through which individual material layers are united to one another to form a well-integrated packaging material. The intimate integrity of the packaging material, which is a vital precondition for the best possible product protection, naturally presupposes that the individual material layers are mutually compatible and unifiable with one another and/or may be united to one another with such bonding strength that they do not delaminate. When the packaging laminate comprises two adjacent layers of mutually sparingly compatible or incompatible materials, for example olefin plastic/ polyester or olefin plastic/EVOH, as may be the case in packaging laminates for oxygen gas-tight packages, the sought-for integrity will be attained using so-called adhesion plastics or similar binders (adhesives) which are applied between the two material layers. The requirement placed on such adhesion plastics and binders is, on the one hand, that they be able, with good bonding strength, to bond to both of the surrounding material layers and, on the other hand, that they themselves form a well-integrated material layer possessing good internal cohesive properties.

Examples of binders of the adhesive type are lacquers, glues and primers, while one known example of a binder of the adhesion plastic type is SURLYN® which is an ionomeric product of ethylene methacrylic acid (EMMA) and zinc acetate. Binders of the adhesive type are often associated with organic solvents which, not least for environmental reasons, it is desirable to avoid, while binders of the adhesion type are, granted, solvent-free, but often associated with high costs.

OBJECTS OF THE INVENTION

One object of the present invention is therefore to propose a method of producing a well-integrated multilayer material of the type described by way of introduction without using either solvent-based or expensive binders or adhesives.

A further object of the present invention is to realise a simple and efficient method of producing such a well-integrated multilayer material on a rational industrial scale.

Still a further object of the present invention is to produce a well-integrated packaging laminate for packages possessing superior oxygen gas barrier properties.
Solution These and other objects and advantages will be attained according to the present invention by a method of the type disclosed in the characterizing clause of appended Claim 1. Expedient embodiments of the method according to the present invention have further been given the characterizing features as set forth in the appended subclaims.

SUMMARY OF THE INVENTION

According to the invention, it has surprisingly been found that the favourable properties of prior art binders of the adhesive type—such as low material costs—may advantageously be combined with the favourable properties of known adhesion plastic type binding agents, in the form of the avoidance of organic solvents, at the same time as the unfavourable properties of the prior art adhesives and binders may effectively be reduced or wholly obviated.

In one practical embodiment of the present invention, the high viscosity binder component consists of a homopolymer of polyethylene, while the low viscosity binder component preferably consists of a single SURLYN® (a neutralized, metal modified ethylene-carboxylic acid copolymer resin), or a polyethylene based adhesive. The mixing ratio between polyethylene and SURLYN® amounts to between 5 and 20 percent of the total weight of the mixture. A binder consisting of approximately 5–20 percent SURLYN® and approximately 95–80 percent polyethylene may be effective as a binder for permanently uniting a material layer of polyester (barrier layer) and a material layer of polyethylene for the formation of a well-integrated packaging laminate by the method according to the invention.

In a further practical embodiment of the present inventions for permanently uniting. a material layer of EVOH (ethylene vinyl alcohol copolymer) and a material layer of polyethylene, the high viscosity binder component consists of polyethylene, while the low viscosity component consists of a polyethylene based adhesion plastic with suitable functional groups which bond to corresponding functional groups in EVOH. A person skilled in the art will be well aware of the appropriate adhesion plastics, for example anhydride modified polyethylene, and may readily select from among them.

According to the invention, the mixing ratio between the high viscosity binder component (polyethylene) an the low viscosity binder component (adhesion plastic with suitable functional groups) may vary, but is preferably selected such that the quantity of the low viscosity binder component amounts to approximately 5–40 percent of the total weight of the binder. A binder consisting essentially of approximately 5–40 percent low viscosity component (adhesion plastic with suitable functional groups) and approximately 95–60 weight percent high viscosity binder component (polyethylene) may function well as a binder for permanently uniting a material layer of EVOH (barrier layer) and a material layer of polyethylene, for the formation of a well-integrated packaging laminate by the method according to the present invention.

BRIEF DESCRIPTION OF THE ACCOMPANYING DRAWING

The present invention will now be described in greater detail hereinbelow with particular reference to non-restrictive embodiments and with reference to the accompanying Drawing, in which:

FIG. 1 schematically illustrates a cross section of a well-integrated multilayer material which is produced by the method according to the present invention; and FIGS. 2A and 2B each show the encircled region in FIG. 1 on a larger scale in low (FIG. 2A) and high (FIG. 2B) proportions, respectively, of low viscosity component in the binder layer of the multilayer material.

DESCRIPTION OF PREFERRED EMBODIMENTS

Referring to the Drawing, FIG. 1 schematically illustrates a cross section of a multilayer material produced by the method according to the present invention and carrying the general reference numeral 10. Granted, in the selected schematic embodiment, the multilayer material 10 comprises but two true main material layers 11 and 12, but it will be obvious to a person skilled in the art that the multilayer material may also include a number of various additional material layers. Hence, the present invention is not restricted to a multilayer material solely displaying the number of material layers shown on the Drawing. Since two material layers are sufficient to illustrate the present invention, the illustrated multilayer material has, for purposes of clarity, been provided with only two main material layers. It should further be observed that the schematically illustrated cross section in FIG. 1 makes no claim whatever to being true to scale, but both of the individual material layers 11 and 12 may, as illustrated, be of equal thickness—yet need not necessarily be so.

In the illustrated embodiment, the material layers 11 and 12 consist of mutually sparingly compatible or incompatible materials, i.e. materials which cannot be permanently united directly to one another by, for example, surface fusion, but require an interjacent layer of an adhesive or binder which has been given the reference numeral 13 in FIG. 1. As has already been pointed out, the selected binder must be capable of bonding with good bonding strength to both of the surrounding material layers 11 and 12, at the same time as the binder must in itself form a cohesive layer possessing good internal cohesive capacity.

According to the invention, the binder layer 13 consists of two components 13a and 13b (as shown in FIGS. 2A and 2B), of which the one, 13a, is to be of relatively high viscosity while the other, 13b, is to be of relatively low viscosity. In this manner, the two binder components form an extrudable mixture of "misfit" viscosity, whereby the mixture may be extruded such that the respective components form more or less individual layers or regions in the extruded film, depending upon the relative mixing ratio of the components.

As a result of the relative viscosity difference, the high viscosity component in the mixture will, as a person skilled in the art will readily appreciate, be concentrated in an intermediate region of the extruded film, while the low viscosity component will correspondingly be "expelled" to the outer regions (surfaces) of the film, and form, in these regions, more or less continuous layers of low viscosity component. In high proportions of the low viscosity component, there will thus be formed a more homogenous and cohesive surface layer of this component, while in lower proportions of the low viscosity component, more or less isolated surface-located portions or islets of the low viscosity component will be formed in the extruded film. This segregation property in the binder mixture forms the basis of the present invention and is utilised in an advantageous manner in the production of the well-integrated multilayer material 10, as will be described in greater detail hereinbelow.

The choice of low viscosity component 13b in the binder layer 13 depends upon the nature of the material in each respective surrounding material layer 11 and 12 to which the low viscosity component 13b serving as binder proper is to bond with high bonding force, while the choice of the high viscosity component 13a serving as bulk or basic matrix for the low viscosity component 13b is relatively free, on condition however that the high viscosity component 13a must be of higher viscosity than the low viscosity component 13b and be compatible with the low viscosity component 13b at least to such an extent that the two components 13a and 13b together form a binder layer 13 possessing good internal cohesion or integrity.

If, for example, the material layer 11 consists of an ethylene vinyl alcohol copolymer (EVOH) as gas barrier in the multilayer material 10, and the materials layer 12 consists of polyethylene, which is a common material combination in packaging laminates for packages possessing gas barrier properties, the low viscosity component 13b will thus be selected from among binders possessing a capacity to bond simultaneously to both EVOH and polyethylene. There are many such binders known in this field and, for a person skilled in the art, the choice is easy to make under these given conditions. Primarily, the low viscosity component 13b according to the invention will be selected from among binders of the type adhesion plastics, for example a polyethylene based adhesion plastic with suitable functional bonding groups which, with good bonding strength, bond to corresponding bonding groups in the two surrounding material layers 11 and 12, i.e. EVOH and polyethylene, respectively. As high viscosity component 13a, a polyethylene would be selected in this given example which, on the one hand, has the requisite high viscosity in relation to the low viscosity polyethylene-based component 13b and, on the other hand, is sufficiently compatible with this component to be able to form a well-integrated binder layer 13. The polyethylene, as the high viscosity component 13a, is further an easily extruded polymer, while at the same time being relatively economical. The proportions of the two selected components 13a and 13b may, according to the invention, vary within broad limits, but since it is the polyethylene based low viscosity adhesion plastic 13b which is relatively the more expensive of the two components, the proportion of this component should be kept as low as possible in relation to the relatively cheaper polyethylene component without, to this end, the requirement on good bonding strength being neglected. In practice, the proportion of the low viscosity polyethylene based component 13b may be approximately 5–40 percent of the total weight of the binder mixture, while the proportion of the high viscosity polyethylene based component 13a should correspondingly be approximately 95–60 percent of the total weight of the binder mixture.

If, on the other hand, the material layer 11 consists of a polyester as gas barrier in the multilayer material 10, and the material layer 12 consists of polyethylene—which is also a commonly occurring material combination in packaging contexts—the low viscosity component 13b is selected from among binders capable of bonding simultaneously to both polyester and polyethylene. There are many such known binders available in this area and, for the person skilled in the art, the choice is easy under these given conditions. One preferred such binder according to the present invention is, however, SURLYN® which is a binder of the adhesion plastic type. As high viscosity component 13a, polyethylene is selected in this given example which, on the one hand, is of the requisite high viscosity in relation to SURLYN® and, on the other hand, is sufficiently compatible with SURLYN® to be able to form a well-integrated binder layer 13. The proportions of the two selected components 13a and 13b in this example may, according to the invention, vary within broad limits, but since SURLYN® is the relatively more expensive of the two components, the proportion of this component should be kept as low as possible in relation to the relatively cheaper polyethylene component 13a, without, to this end, the requirement on good bonding strength being neglected. In practice, the proportion of the low viscosity component 13b, i.e. SURLYN® may be approximately 5–20 percent of the total weight of the binder mixture, while the proportion of the high viscosity polyethylene component 13a may correspondingly be approximately 95–80 percent of the total weight of the binder mixture.

As has been mentioned in the foregoing, in low proportions (see FIG. 2A) of the low viscosity component 13b, this component will form more or less isolated surface-located portions or islets 13b when the binder mixture is extruded, these islets in turn forming the interface of the binder layer 13 to surrounding material layers 11 and 12 on both sides of the binder layer 13, in which event the requirements according to the present invention on good bonding strength can be met only if the effective surface of these islets 13b is sufficiently large, as will readily be perceived. According to the present invention, this requirement will be met if the proportion of the low viscosity component 13b in the first case with polyethylene based adhesion plastic is at least 5 percent, and in the second case as disclosed above involving SURLYN® is similarly at least 5 percent of the total weight of the binder layer.

In high proportions (see FIG. 2B) of the low viscosity component 13b, this component will, on extrusion of the binder mixture, form a more cohesive surface layer 13b on both sides of the binder layer 13, this cohesive layer 13b correspondingly constituting the interface of the binder layer to surrounding material layers 11 and 12. The proportion of the low viscosity component 13b may, of course, be as high as possible, but for practical, economical reasons, the proportion of the low viscosity component 13b should, in the first case involving polyethylene based adhesion plastic, not be higher than approximately 40 percent of the total weight of the binder mixture. For the same reasons, the proportion in the second case involving SURLYN® should not be higher than approximately 20 percent of the total weight of the binder mixture.

The multilayer material 10 may be produced by a simple extrusion process according to which a prefabricated web or film of the one material layer. 11 (e.g. EVOH or polyester) is led through the nip between two rotary press/cooling rollers at the same time as a film of material for the second material layer 12 (e.g. polyethylene) is extruded against the one side of the prefabricated film or web. In order to bind the extruded film to the prefabricated film or web with good bonding strength, a film of a suitable binder mixture according to the invention as described above is extruded between the prefabricated film or web and the extruded film under such conditions that the low viscosity adhesion plastic component 13b is expelled to the surface of the extruded binder film, while the high viscosity binder component 13a remains as bulk or basic matrix in the region between the expelled low viscosity adhesion plastic component within the extruded binder film.

According to another embodiment of the method according to the present invention, the binder mixture may be co-extruded together with the polyethylene film and, according to yet a further embodiment of the present invention, it is also possible to co-extrude all of the illustrated layers 11, 12 and 13 in the multilayer material 10.

The present invention thus realises a simple and efficient method of producing a well-integrated multilayer material 10 in which two adjacent material layers 11 and 12 of mutually sparingly compatible or incompatible materials may be bonded to one another with good bonding strength without the employment of organic solvents, as are associated with prior art so-called adhesives, lacquers, primers etc., and without the need to employ greater quantities of expensive adhesion plastics than are absolutely necessary for achieving the requisite bonding strength between the two sparingly compatible or incompatible material layers 11 and 12. While the present invention has been described in the foregoing with particular reference to few concrete examples of usable components in the binder, and to but two concrete examples of such sparingly compatible or incompatible material layers, it will be obvious to the skilled reader of this specification that the present invention is not restricted exclusively to these embodiments selected by way of example. Without departing from the spirit and scope of the inventive concept as herein disclosed, the present invention may, by suitable choice of binder components and taking the above disclosures as guidelines, also be employed in other combinations of sparingly compatible or incompatible material combinations. Such other material combinations and modifications will be obvious to a person skilled in the art and are encompassed by the appended Claims. It should further be observed that the well-integrated multilayer material 10 may also include more pairs of sparingly compatible or incompatible material combinations than the above described individual pair, and the method according to the present invention may also be employed for producing such multi-combination materials.

What is claimed is:

1. A method for producing a well-integrated multilayer material having a first material layer adjacent a second material layer, the second material layer being sparingly compatible with the first material layer, the method comprising:

providing the first layer, the first layer being polyethylene;

providing the second layer, the second layer being selected from the group consisting of ethylene vinyl alcohol and polyester; and binding the first material layer to the second material layer with a coextruded adhesive layer consisting essentially of 60 to 95 parts of a high viscosity binder component, which is an ethylene homopolymer and 5 to 40 parts of a low viscosity binder component, which is a single neutralized, metal modified ethylene-carboxylic acid copolymer or a polyethylene based adhesive, the low viscosity binder component being capable of binding to the first material layer and the second material layer, the high viscosity binder component being capable of interacting with the low viscosity binder component.

2. The method according to claim 1 wherein the adhesive is applied by extrusion for formation of a binder layer between the first and second material layers.

3. The method according to claim 1 wherein the low viscosity binder component is of the adhesion plastic type.

4. The method according to claim 1 wherein the low viscosity binder component is based on polyethylene and displays functional bonding groups capable of bonding to the first and second material layers.

5. The method according to claim 1 wherein the first material layer is a polyester, the second material layer is a polyethylene, and the low viscosity binder component is a neutralized, metal modified ethylene-carboxylic acid copolymer.

6. The method according to claim 1 wherein the first material layer is an ethylene vinyl alcohol copolymer, the second material layer is a polyethylene, and the low viscosity binder component is of the adhesion plastic type with functional bonding groups capable of bonding both to corresponding bonding groups of the ethylene vinyl alcohol copolymer and the polyethylene.

7. The method according to claim 6 wherein the low viscosity binder component is anhydride modified polyethylene.

8. The method according to claim 1 wherein the concentration of the low viscosity binder component relative to the concentration of the high viscosity component provides for the low viscosity binder component to form a cohesive surface layer on the adhesive layer.

9. The method according to claim 1 wherein the concentration of the low viscosity binder component relative to the concentration of the high viscosity component provides for the low viscosity binder component to form a plurality of isolated islets of the low viscosity binder component on the surface of the adhesive layer.

10. A method for producing a well-integrated multilayer material, the method comprising:

providing a first prefabricated material, the first prefabricated material being polyethylene;

extruding a second material relative to the first prefabricated material, the second material being selected from the group consisting of ethylene vinyl alcohol and polyester;

co-extruding an adhesive layer between the first prefabricated material and the second material, the adhesive layer consisting essentially of 60 to 95 parts of a high viscosity binder component, which is an ethylene homopolymer and 5 to 40 parts of a low viscosity binder component, which is a single neutralized, metal modified-carboxylic acid copolymer or a polyethylene based adhesive, the low viscosity binder component being capable of binding to the first material layer and the second material layer, the high viscosity binder component being capable of interacting with the low viscosity binder component.

11. The method according to claim 10 wherein the low viscosity binder component is of the adhesion plastic type.

12. The method according to claim 10 wherein the low viscosity binder component is based on polyethylene and displays functional bonding groups capable of bonding to the first and second material layers.

13. The method according to claim 10 wherein the first material layer is a polyester, the second material layer is a polyethlene, and the low viscosity binder component is a neutralized, metal modified ethylene-carboxylic acid copolymer.

14. The method according to claim 10 wherein the first material layer is an ethylene vinyl alcohol copolymer, the second material layer is a polyethlyene, and the low viscosity binder component is of the adhesion plastic type with functional bonding groups capable of bonding both to corresponding bonding groups of the ethylene vinyl alcohol copolymer and the polyethylene.

15. The method according to claim 14 wherein the low viscosity binder component is anhydride modified polyethlene.

16. The method according to claim 10 wherein the concentration of the low viscosity binder component relative to the concentration of the high viscosity component provides for the low viscosity binder component to form a cohesive surface layer on the adhesive layer.

17. The method according to claim 10 wherein the concentration of the low viscosity binder component relative to the concentration of the high viscosity component provides for the low viscosity binder component to form a plurality of isolated islets of the low viscosity binder component on the surface of the adhesive layer.

18. A method for producing a well-integrated multilayer material, the method comprising:

extruding a first material layer, the first material layer being polyethylene;

co-extruding a second material relative to the first extruded material, the second extruded material being sparingly compatible with the first extruded material, the second material being selected from the group consisting of polyester and ethylene vinyl alcohol; and;

co-extruding an adhesive layer between the first extruded material and the second extruded material the adhesive layer consisting essentially of 60 to 95 parts of a high viscosity binder component, which is an ethylene homopolymer and 5 to 40 parts of a low viscosity binder component, which is a neutralized, metal modified-carboxylic acid copolymer or a polyethylene based adhesive, the low viscosity binder component being capable of binding to the first extruded material layer and the second extruded material layer, the high viscosity binder component being capable of interacting with the low viscosity binder component.

19. The method according to claim 18 wherein the first extruded material layer is a polyester, the second extruded material layer is a polyethylene, and the low viscosity binder component is a neutralized, metal modified ethylene-carboxylic acid copolymer.

20. The method according to claim 18 wherein the first extruded material layer is an ethylene vinyl alcohol copolymer, the second extruded material layer is a polyethylene, and the low viscosity binder component is of the adhesion plastic type with functional bonding groups capable of bonding both to corresponding bonding groups of the ethylene vinyl alcohol copolymer and the polyethylene.

21. The method according to claim 18 wherein the concentration of the low viscosity binder component relative to the concentration of the high viscosity component provides for the low viscosity binder component to form a cohesive surface layer on the adhesive layer.

* * * * *